United States Patent [19]
Parsons

[11] 3,785,172
[45] Jan. 15, 1974

[54] CONSTANT VELOCITY UNIVERSAL JOINT

[75] Inventor: Richard H. Parsons, Saginaw, Mich.

[73] Assignee: General Motors Corporation, Detroit, Mich.

[22] Filed: Nov. 6, 1972

[21] Appl. No.: 304,000

[52] U.S. Cl. .................................... 64/21, 64/8
[51] Int. Cl. .................................... F16d 3/30
[58] Field of Search .............................. 64/21, 8, 7

[56] References Cited
UNITED STATES PATENTS

| | | | |
|---|---|---|---|
| 3,151,473 | 10/1964 | Cull | 64/21 |
| 3,368,370 | 2/1968 | Gravel | 64/21 |
| 3,678,706 | 7/1972 | Shirley | 64/21 |
| 3,714,798 | 2/1973 | Macielinski | 64/7 |

Primary Examiner—Charles J. Myhre
Assistant Examiner—Randall Heald
Attorney—W. S. Pettigrew et al.

[57] ABSTRACT

A constant velocity universal joint of the ball and groove type is provided with a double offset cage for locating the drive balls in the constant velocity plane. The cage has an interior bearing seat at one end only and an enlarged opening at the other end which facilitates the assembly of the joint by permitting the direct axial insertion of an inner drive member into the cage in the properly oriented position. The enlarged opening is closed by an end plate which cooperates with means carried by the inner drive member to maintain the inner drive member in bearing engagement with the cage. In one disclosed construction this means comprises an undersized ball carried in a cavity in the end of a shaft on which the inner drive member is mounted. In a second disclosed construction the means comprises a spring biased bearing shoe telescopingly carried by the shaft.

6 Claims, 6 Drawing Figures

CONSTANT VELOCITY UNIVERSAL JOINT

This invention relates generally to constant velocity universal joints and more specifically to constant velocity universal joints having a "double offset" cage such as is illustrated in the U.S. Pat. No. 3,464,232 issued to Philip Hutchinson on Sept. 2, 1969 and in FIG. 4 of the U.S. Pat. No. 2,046,584 issued to Albert H. Rzeppa on July 7, 1936.

This type of universal joint requires that the inner drive member be accurately socketed in a cage for pivotal movement about a center offset from the center plane of the cage in which the drive balls are located by the cage windows. Such a requirement has been met in the past as is, for example, shown in the aforementioned Hutchinson and Rzeppa patents by an accurately ground inner spherical seat on the cage engaging both sides of mating accurately ground spherical surfaces on the lands between the ball grooves in the inner drive member. The disadvantage of such a construction is the difficulty of assembling the cage to the inner drive member. For example, one method of assembly requires special machined grooves or counterbores exposing the inner portions of the ball windows at one end of the cage so that the inner member can be inserted into the cage with its lands aligned with the windows to permit them to pass through notches in the spherical seat formed by exposing the ball window inner ends. This method requires a correlation between the width of the lands and the cage windows and reorientation of the inner member after insertion into the cage to its proper relationship to the cage. Furthermore, such a method does not lend itself to constructions where the generally axial ball grooves in the inner drive member are helical or tangent rather than parallel to the axis of the inner drive member. Other known methods of assembly have generally followed this approach and also require more or less confining correlations between the inner member lands and the cage windows to permit insertion of the inner member into the cage and reorientation of the inner member after it is inserted.

Another significant disadvantage of the construction exemplified in the aforementioned Hutchinson and Rzeppa patents is that the mating partispherical surfaces on the inner member lands and the partispherical seat must be very accurately ground to close tolerances with very little clearance between the surfaces to properly locate the pivot center between the inner member and the cage with respect to a second offset pivot center defined by an outer partispherical surface on the cage and thus are expensive to manufacture.

Another disadvantage of such a construction is that the wall section of the cage is necessarily of such a variation due to the requirement for a partispherical control surface on the outer periphery of the cage offset from the inner partispherical seat that it is difficult to pierce the ball windows of the cage and consequently they must be drilled and broached at a much greater cost.

It is an object of my invention to provide a universal joint having a double ofset cage which avoids one or more of the disadvantages mentioned above.

It is another object of my invention to provide a universal joint having a double offset cage in which the cage may be cold formed in a conventional press with a suitable die forming operation thereby significantly reducing the requirements for costly machining and grinding operations.

Another object of my invention is to provide a universal joint with a double offset cage which has a generally uniform wall thickness thereby permitting piercing of the ball windows.

Another object of my invention is to provide a universal joint having a double offset cage in which the assembly of the inner member to the cage is facilitated.

Another object of my invention is to provide a universal joint having a double offset cage in which the inner member is easily assembled to the cage irrespective of whether it has parallel, tangent or helical ball grooves.

Still another object of my invention is to provide a universal joint having a double offset cage in which the partispherical seat for the inner member on the cage exists on only one side of the inner member thereby making it possible to leave an opening of sufficient size in the opposite end of the cage to permit insertion of the inner member directly into the seat in its correctly oriented position.

Still another object of my invention is to provide a universal joint having a double offset cage incorporating means to take up clearances between the inner member and the cage due to tolerance variations.

Yet another object of my invention is to provide a universal joint having a double offset cage which compensates for wear incident to the bearing engagement between the cage and the inner drive member.

Yet still another object of my invention is to provide a universal joint having a double offset cage in which end play between the inner member and the cage is minimized.

Yet still another object of my invention is to provide a universal joint having a double offset cage incorporating means lightly biasing the inner member into good bearing engagement with the partispherical bearing seat.

Other objects and advantages of the invention will become apparent to those skilled in the art as the disclosure is made in the following detailed description of preferred embodiments of the invention as illustrated in the accompanying sheets of drawing in which.

Figure 1:
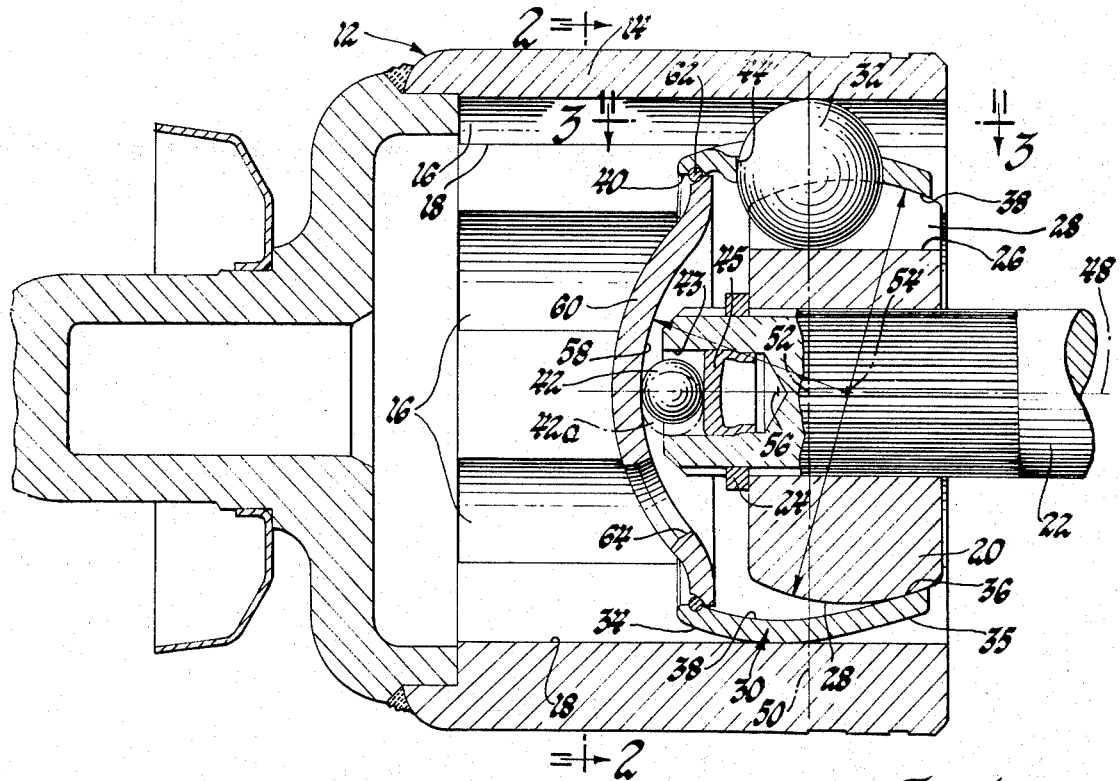
FIG. 1 is an axial section view of a universal joint in accordance with a first embodiment of my invention.
Figure 2:
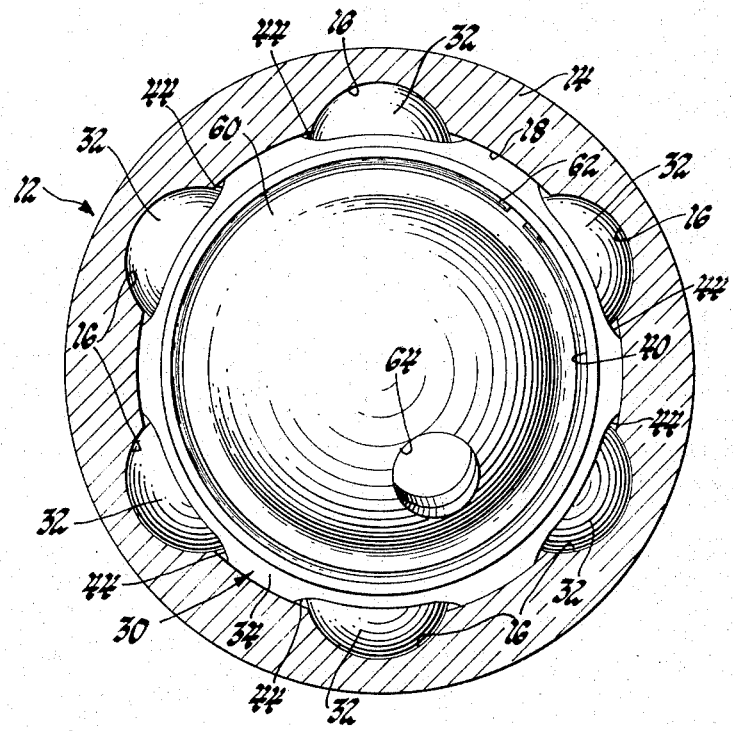
FIG. 2 is a section taken substantially along the line 2—2 of FIG. 1.
Figure 3:
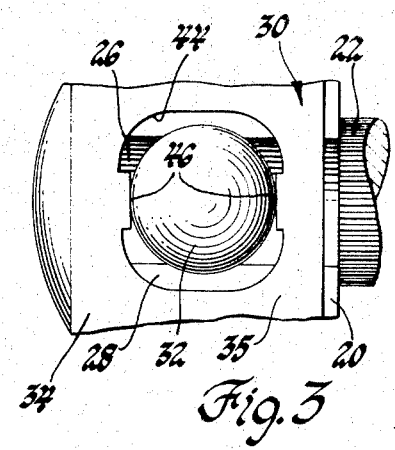
FIG. 3 is a section taken substantially along the line 3—3 of FIG. 1.

Referring now to the drawings and more specifically to the first embodiment shown in FIGS. 1, 2 and 3, the universal joint 12 comprises a hollow outer drive member 14 having six equally circumferentially spaced axial ball grooves 16 radiating from a cylindrical bore 18. Disposed within the hollow outer member 14 is an inner member 20 splined onto the end portion of a shaft 22 and located on the shaft end portion by a snap ring 24. The inner member 20 also has six axial ball grooves 26 which are separated by a like number of partispherical lands 28. The inner member 20 is disposed for universal pivoting movement in a cage 30 which itself slides and pivots universally in the bore 18 of the outer member 14. Drive is transmitted between the outer member 14 and the inner member 20 by an array of balls 32 disposed in the ball grooves 16 and 26 which array is maintained coplanar by the cage 30.

The principle of achieving constant velocity operation between the inner member 20 and the outer member 14 by locating the drive balls 32 at all joint angles in the homokinetic or constant velocity plane which is perpendicular to the plane defined by the axes of the inner and outer members and which bisects the angle formed by the axes of the inner and outer members is well known. It is equally well known from the U.S. Pat. to Rzeppa, No. 2,046,584, FIG. 4, that the drive balls can be so located in the constant velocity plane by a cage having specific relationships to the inner and outer members which cage permits the use of simple straight axial ball grooves in the inner and outer members parallel to their respective axes, although helical or tangential grooves might be employed for other reasons. Such a cage has come to be known as a double offset cage and the cage 30 in the universal joint 12 is such a double offset cage.

From FIG. 3 it is seen that the drive balls 32 are disposed in ball windows 44 provided in the cage 30. The width of the ball windows 44 between the flat end faces 46 is such that the windows 44 maintain the balls 32 centered axially in the pockets within manufacturing limits. The windows 44, however, are slightly elongated in the circumferential direction since some slight relative circumferential movement between the balls 32 and the cage 30 occurs when the joint 12 is angulated and rotated. The plane perpendicular to the longitudinal axis 48 of the cage which bisects the width of the ball windows 44 between the flat end faces 46 may be defined as the center plane 50 of the cage and the intersection of the plane 50 with the axis 48 of the cage may be defined as the center point 52 of the cage.

As is recognized in the aforementioned Rzeppa patent, the cage 30 must universally pivot on the outer member 14 about a center 56 lying on the longitudinal axis 48 of the cage and offset from the center point 52 and the inner member 20 must universally pivot on the cage 30 about a center 54 lying on the longitudinal axis 48 of the cage and offset in the opposite direction from the center point 52 by an equal amount.

In order to fulfill this requirement, the cage 30 first of all has an outer partispherical control surface 34 on its outer periphery generated from the offset center 56 and having a diameter matching that of the bore 16 so that the cage pivots and slides within the hollow outer drive member 14. The partispherical control surface need not extend for the entire length of the cage in the telescoping type joint shown in FIG. 1 as it is sometimes desirable to have a frustonconical portion 35 to limit joint angulation.

Secondly, the cage 30 includes a partispherical seat 36 on its inner periphery 38 generated from the offset center 54 and having a diameter matching that of the partispherical lands 28. The partispherical seat 36, however, does not span the crown of the lands and thus engages the lands 36 only on portions facing the opening 38 illustrated at the right end of the cage in FIG. 1. In other words at any operative angle of the joint, the partispherical seat 36 prevents the inner member 20 and shaft 22 from being pulled out of the opening 38 but does not prevent axial movement in the other direction toward the opening 40 at the other end of the cage. In fact, the opening 40 is enlarged and the remaining inner peripheral surface of the cage 30 from the partispherical seat 36 to the opening 40 at the opposite end of the cage (the left end as shown in FIG. 1) is contoured to permit the direct axial insertion of inner member 20 and the shaft 22 into the cage 30 with the ball grooves 26 aligned with the windows 44.

In order to hold the inner member 20 and the shaft 22 in their proper operative position, the end of the shaft 22 carries an undersized ball 42 in a cavity 43 against a plug 45 adjustably secured in the cavity 43. Preferably the plug 45 comprises an inverted cup deformed into tight engagement with a stepped portion of the cavity 43. The ball 42 engages an interior partispherical surface 58 on an end plate 60 secured in the enlarged opening 40 of the cage 30 by a lock ring 62 or other suitable means. The interior partispherical surface 58 is substantially concentric with the partispherical seat 36 so that when the shaft 22 is angulated with respect to the cage 30 within the operative range of the universal joint 12, the lands 28 are maintained in bearing engagement with the partispherical seat 36. The end plate 60 also includes an eccentric hole 64 outside of the normal operating range of the interior partispherical surface 58 which has a diameter sufficient to permit passage of the cup 45 and the undersized ball 42 through it.

The universal joint 12 is assembled in the following manner. The inner member 20 is first spline connected to the shaft 22 and retained thereon by the snap ring 24. This subassembly is then axially inserted into the cage with the lands 28 properly oriented through the opening 40 and held against the seat 36. After the end plate 60 is secured in the opening 40 by the lock ring 62, the subassembly comprising shaft 22 and inner member 20 is angulated with respect to the cage 30 until the cavity 43 aligns with the eccentric hole 64 in the end plate 60; this angulation being greater than the maximum angle encountered during the normal operation of the joint 12. The inverted cup 45 and undersized ball 42 are then inserted through the hole 64 in the end plate 60 into the cavity 43 and the inverted cup is pressed into the stepped portion of the cavity 43 to the proper depth to take up clearance and tolerance variations between the inner drive member 20 and the cage 30. Thereafter when the inner drive member 20 and shaft 22 are returned to a normal operating angle range, the ball 42 rides against the interior partispherical surface 58 on the end plate 60 and maintains the partispherical lands 28 on the inner drive member 20 in bearing engagement with the partispherical seat 36 thus establishing the pivot center for the inner drive member 20 and shaft 22 on the offset center 54. In pressing the inverted cup 45 in the cavity 43, the depth at which the inverted cup 45 is located is preferably that depth at which the ball 42 has a slight interference fit and is located exactly on the centerline 48 of the cage 30 when the shaft axis coincides with that of the cage or in other words when the joint 12 is at zero angle. The slight interference fit of the ball between the inverted cup 45 and the end plate 60 produces a light biasing of the partispherical lands 28 into a good bearing engagement with the partispherical seat 36. Because the ball 42 is undersized with respect to the cavity 43, it may locate in an offset position such as is shown in phantom at 42a in FIG. 1. In this position, the ball wedges the shaft 22 and inner drive member 20 further away from the end plate 60. As the joint is angulated and rotated, the ball 42 has a tendency to offset and orbit in a small circular pattern on the end plate surface 56. This ability of the ball 42 to adjust itself within the cavity 43 gives a slight range to the depth that the inverted cup may be initially located in the cavity 43 and also compensates for the wear which results from the bearing engagement between the lands 28 and the cage 30.

After the cage 30 has so been assembled to the inner member 20 and the shaft 22 as described above, the drive balls 32 are then inserted into the ball grooves 26 in the inner member 22 through the cage windows 44. To complete the universal joint to the extent shown in FIG. 1, it is merely necessary to telescope these parts into the bore of the hollow drive member 14 with the drive balls 32 aligned with the outer ball grooves 16.

Figure 4:
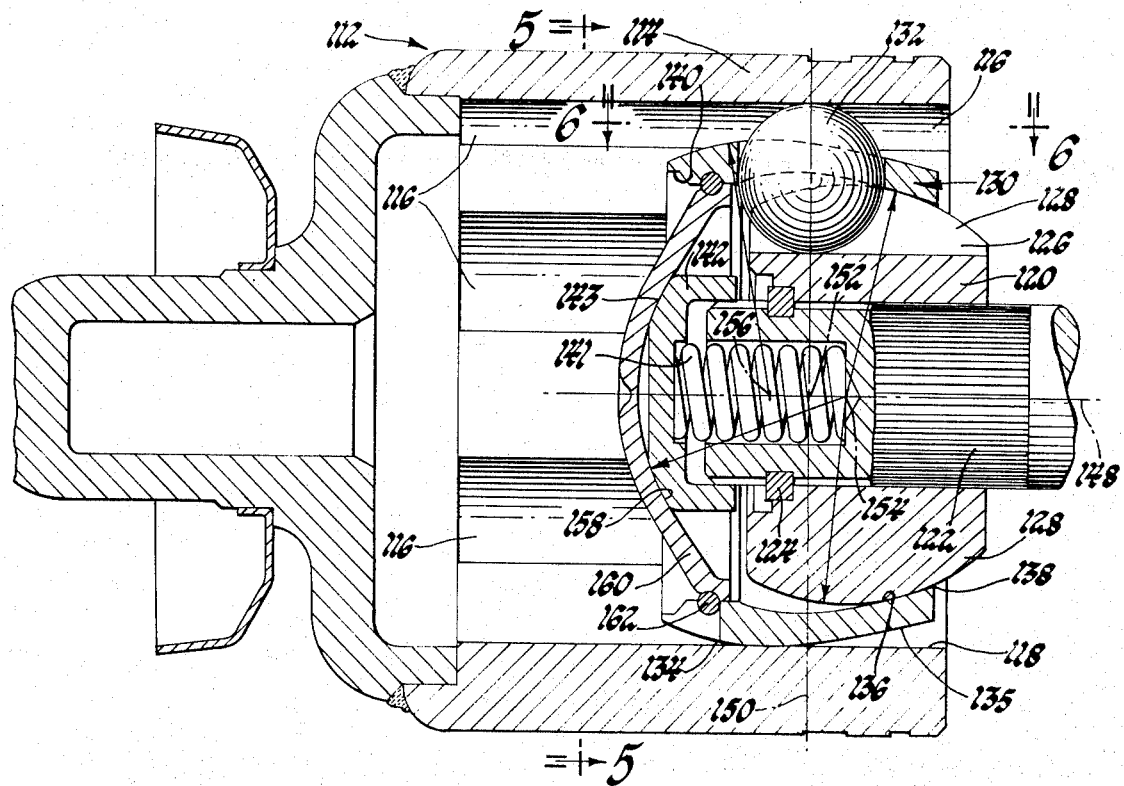
FIG. 4 is an axial section view of a universal joint in accordance with a second embodiment of my invention.

While the universal joint 12 illustrated in FIGS. 1, 2 and 3 is a telescoping type joint such as is shown in the aforementioned Hutchinson patent, the principles of my invention are equally applicable to a fixed center or non-telescoping type joint such as is shown in FIG. 4 of the aforementioned Rzeppa patent with minor structural adjustments which are obvious in view of the only difference between the telescoping and non-telescoping joints being the configuration of the hollow outer member cavity. In the non-telescoping joint, this cavity is a concave partispherical socket in which the cage pivots universally. In the telescoping joint, the cavity is a cylinder in which the cage obviously slides as well as pivots universally.

In assembling the non-telescoping type joint, such as is shown in the Rzeppa patent, the cage 30 would first be assembled into the partispherical socket of the outer drive member. The subsequent assembly steps would be as described above except that the shaft 22 and inner member 20 would have to be angulated to an extreme degree to expose the outer sides of the cage windows to permit insertion of the balls into the ball grooves 26 in the inner member 20 through the cage windows 44.

Figure 5:
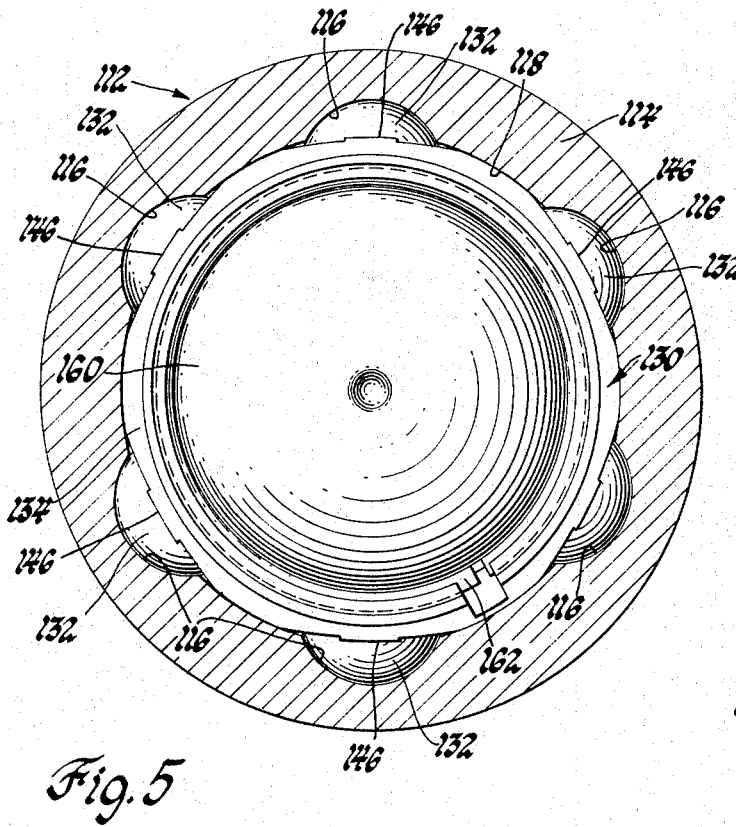
FIG. 5 is a section taken substantially along the line 5—5 of FIG. 4.
Figure 6:
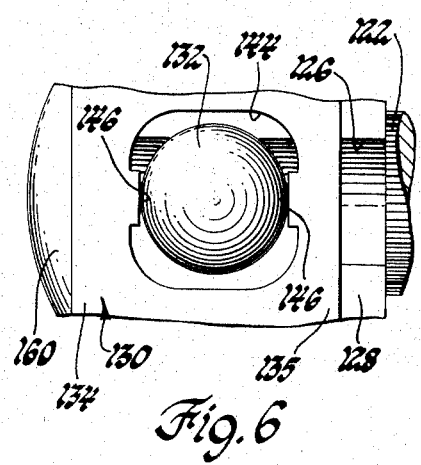
FIG. 6 is a section taken substantially along the line 6—6 of FIG. 4.

Referring now to FIGS. 4, 5 and 6, there is illustrated a second embodiment of my invention with an alternate means for holding the inner member 120 and shaft 122 in their proper operative position within the cage 130. As is evident from the following description, a majority of the parts of the universal joint 112 are substantially identical to those of the universal joint 12.

The universal joint 112 likewise comprises a hollow outer drive member 114 having six equally circumferentially spaced axial ball grooves 116 radiating from a cylindrical bore 118. Disposed within the hollow outer member 114 is an inner member 120 splined onto the end portion of a shaft 122 and located on the shaft end portion by a snap ring 124. The inner member 120 also has six axial ball grooves 126 which are separated by a like number of partispherical lands 128. The inner member 120 is disposed for universal pivoting movement in a cage 130 which itself slides and pivots universally in the bore 118 of the outer member 114. Drive is transmitted between the outer member 114 and the inner member 120 by an array of balls 132 disposed in the ball grooves 116 and 126 which array is maintained coplanar by the cage 130.

The drive balls 132 are disposed in ball windows 144 provided in the cage 130. The width of the ball windows 144 between the flat end faces 146 is such that the windows 144 maintain the balls 132 centered axially in the pockets within manufacturing limits. The windows 144, however, are slightly elongated in the circumferential direction since some slight relative circumferential movement between the balls 132 and the cage 130 occurs when the joint 112 is angulated and rotated. The plane perpendicular to the longitudinal axis 148 of the cage which bisects the width of the ball windows 144 between the flat end faces 146 may be defined as the center plane 150 of the cage and the intersection of the plane 150 with the axis 148 of the cage may be defined as the center point 152 of the cage.

As is recognized in the aforementioned Rzeppa patent, the cage 130 must universally pivot on the outer member 114 about a center 156 lying on the longitudinal axis 148 of the cage and offset from the center point 152 and the inner member 120 must universally pivot on the cage 130 about a center 154 lying on the longitudinal axis 148 of the cage and offset in the opposite direction from the center point 152 by an equal amount.

In order to fulfill this requirement, the cage 130 first of all has an outer partispherical control surface 134 on its outer periphery generated from the offset center 156 and having a diameter matching that of the bore 116 so that the cage pivots and slides within the hollow outer drive member 114. The partispherical control surface need not extend for the entire length of the cage in the telescoping type joint shown in FIG. 4 as it is sometimes desirable to have a frustoconical portion 135 to limit joint angulation.

Secondly, the cage 130 includes a partispherical seat 136 on its inner periphery 138 generated from the offset center 154 and having a diameter matching that of the partispherical lands 128. The partispherical seat 136, however, does not span the crown of the lands and thus engages the lands 136 only on portions facing the opening 138 illustrated at the right end of the cage in FIG. 4. In other words at any operative angle of the joint, the partispherical seat 136 prevents the inner member 120 and shaft 122 from being pulled out of the opening 138 but does not prevent axial movement in the other direction toward the opening 140 at the other end of the cage. In fact, the opening 140 is enlarged and the remaining inner peripheral surface of the cage 130 from the partispherical seat 136 to the opening 140 at the opposite end of the cage (the left end as shown in FIG. 4) is contoured to permit the direct axial insertion of inner member 120 and the shaft 122 into the cage 130 with the ball grooves 126 aligned with the windows 144.

In order to hold the inner member 120 and the shaft 122 in their proper operative position, the end of the shaft 122 telescopingly carries a bearing shoe 142 having a partispherical portion on its face 143. A coil spring 141 disposed behind the bearing shoe 142 in a cavity in the end of the shaft 122 urges the shoe 142 away from the shaft and resiliently biases the partispherical portion on the face 143 into engagement with an interior partispherical surface 158 on an end plate 160 secured in the enlarged opening 140 of the cage 130 by a lock ring 162 or other suitable means. The interior partispherical surface 158 is substantially concentric with the partispherical seat 136 so that when the shaft 122 is angulated with respect to the cage 130 within the operative range of the universal joint 112, the lands 128 are maintained in bearing engagement with the partispherical seat 136.

The universal joint 112 is assembled in the following manner. The inner member 120 is first spline connected to the shaft 122 and retained thereon by the snap ring 124. This subassembly is then axially inserted into the cage with the lands 128 properly oriented through the opening 140 and held against the seat 136. The end plate 160 is then placed against the face 143 of the bearing shoe 142 and secured in the opening 140 by the lock ring 162 against the bias of the spring 141.

After the cage 130 has so been assembled to the inner member 102 and the shaft 122, the drive balls 136 are then inserted into the ball grooves 126 in the inner member 122 through the cage window 144. To complete the universal joint to the extent shown in FIG. 4, it is merely necessary to telescope these parts into the bore of the hollow drive member 114 with the drive balls 132 aligned with the outer ball grooves 116.

while the universal joint 112 illustrated in FIGS. 4, 5 and 6 is a telescoping type joint such as is shown in the aforementioned Hutchinson patent, the principles of my invention are equally applicable to a fixed center or non-telescoping type joint such as is shown in FIG. 4 of the aforementioned Rzeppa patent with minor structural adjustments to compensate for the cavity in the hollow outer member cavity being a concave partispherical socket rather than in a cylinder.

In assembling the non-telescoping type joint such as is shown in the Rzeppa patent, the cage 130 would first be assembled into the partispherical socket of the outer drive member and then the inner drive member and the cage would be assembled as described above. In assembling the balls, however, the shaft 122 and inner member 120 would have to be angulated to an extreme degree to expose the outer sides of the cage windows 144 from the outer drive member to permit insertion of the balls into the ball grooves 126 in the inner member 120 through the cage windows 144.

I wish it to be understood that I do not desire to be limited to the exact details of construction shown and described, for obvious modifications will occur to a person skilled in the art.

I claim:

1. In a constant velocity universal joint the combination comprising an annular cage having a plurality of ball receiving windows, a drive shaft having an end portion protruding into said cage through an oversized opening at one end of said cage, an inner drive member non-rotatably secured to the end portion of said drive shaft disposed in said cage, said inner drive member having a plurality of partispherical lands and generally axial ball grooves separated by said partispherical lands, said cage having an inner partispherical seat adjacent said oversized opening engaging one side of said partispherical lands, said cage having an enlarged opening at the other end through which said drive shaft with said inner drive member mounted thereon is axially insertable in any rotational orientation, an end plate having an interior partispherical surface substantially concentric with said partispherical seat secured in said enlarged opening at said other end of said cage, and means carried by said end portion of said drive shaft engaging said interior partispherical surface biasing said partispherical lands into bearing engagement with said partispherical seat.

2. In a constant velocity universal joint the combination comprising an annular cage having inner and outer peripheral surfaces and a plurality of circumferentially spaced ball receiving windows for maintaining an array of balls coplanar extending from said inner peripheral surface to said outer peripheral surface, said inner peripheral surface including a partispherical seat curving radially inwardly toward an opening at one end of said cage, an elongated inner drive means axially insertable into said cage through an enlarged opening at the other end of said cage, said elongated inner drive means including a portion disposed in said cage having partispherical lands separated by a plurality of generally axial ball grooves, said partispherical lands engaging said partispherical seat for pivotal movement of said elongated drive means with respect to said cage, an end plate secured to said cage across said enlarged opening at said other end, said end plate having an interior partispherical surface substantially concentric with the partispherical seat on the inner periphery of said cage, and automatically adjustable means carried by said inner drive member engaging said interior partispherical surface on said end plate and taking up any clearances between said partispherical lands on said elongated inner drive member and said partispherical seat in said cage to provide good bearing engagement therebetween for the accurate pivotal movement of said elongated inner drive member with respect to said cage.

3. In a constant velocity universal joint the combination comprising an annular cage having a plurality of circumferentially spaced ball receiving windows and a partispherical seat on the inner periphery thereof offset toward one end of said cage and a partispherical control surface on the outer periphery thereof equally offset toward the opposite end of said cage, a drive shaft having one axial end thereof disposed in said cage, an inner drive member having a plurality of partispherical lands and ball grooves on the end portion of said drive shaft adjacent said one axial end, said inner drive member being disposed in said cage with said partispherical lands in bearing engagement with said partispherical seat, said cage having an enlarged opening at said opposite end which is sufficient to axially insert said inner drive member into said cage in any circumferential orientation, an end plate secured to said cage across an enlarged opening at the opposite end of said cage, said end plate having an interior partispherical surface substantially concentric with said partispherical seat, and a ball radially adjustably carried by said shaft protruding from said one axial end and engaging said interior partispherical surface on said end plate to maintain said partispherical lands in bearing engagement with said partispherical seat.

4. In a constant velocity universal joint the combination comprising an annular cage having a plurality of circumferentially spaced ball receiving windows and a partispherical seat on the inner periphery thereof offset toward one end of said cage and a partispherical control surface on the outer periphery thereof equally offset toward the opposite end of said cage, a drive shaft having a cavity in one axial end thereof, a plug secured in said cavity to a predetermined depth, an inner drive member having a plurality of partispherical lands and ball grooves on the end portion of said drive shaft adjacent said one axial end, said inner drive member being disposed in said cage with said lands in bearing engagement with said partispherical seat, said cage having an enlarged opening at said opposite end which is sufficient to axially insert said inner drive member into said cage in any circumferential orientation, an end plate secured to said cage across said enlarged opening, said end plate having an interior partispherical surface substantially concentric with said partispherical seat and an eccentric hole sufficient to permit passage of said plug therethrough for insertion into said cavity when said cage is angulated on said inner member beyond the maximum angle encountered during the normal operation of said universal joint, and an undersized ball disposed in said cavity against said plug and engaging said partispherical surface on said end plate to maintain said partispherical lands in bearing engagement with said partispherical seat.

5. In a constant velocity universal joint the combination comprising an annular cage having a plurality of circumferentially spaced ball receiving windows and a partispherical seat on the inner periphery thereof offset toward one end of said cage and a partispherical control surface on the outer periphery thereof equally offset toward the opposite end of said cage, a drive shaft having one axial end thereof disposed in said cage, an inner drive member having a plurality of partispherical lands and ball grooves on the end portion of said drive shaft adjacent said one axial end, said inner drive member being disposed in said cage with said partispherical lands in bearing engagement with said partispherical seat, said cage having an enlarged opening at said opposite end which is sufficient to axially insert said inner drive member into said cage in any circumferential orientation, an end plate secured to said cage across an enlarged opening at the opposite end of said cage, said end plate having an interior partispherical surface substantially concentric with said partispherical seat, and a resiliently biased bearing shoe carried by said shaft protruding from said one axial end and engaging said interior partispherical surface on said end plate to maintain said partispherical lands in bearing engagement with said partispherical seat.

6. In a constant velocity universal joint the combination comprising an annular cage having a plurality of circumferentially spaced ball receiving windows and a partispherical seat on the inner periphery thereof offset toward one end of said cage and a partispherical control surface on the outer periphery thereof equally offset toward the opposite end of said cage, a drive shaft having an axial end disposed in said cage, an inner drive member having a plurality of partispherical lands and ball grooves on the end portion of said drive shaft adjacent said one axial end, said inner drive member being disposed in said cage with said lands in bearing engagement with said partispherical seat, said cage having an enlarged opening at said opposite end which is sufficient to axially insert said inner drive member into said cage in any circumferential orientation, an end plate secured to said cage across said enlarged opening having an interior partispherical surface substantially concentric with said partispherical seat, a bearing shoe telescopingly carried by said end portion of said drive shaft engaging said interior partispherical surface on said end plate, and resilient means urging said bearing shoe away from said one axial end of said shaft toward said interior partispherical surface on said end plate to maintain said partispherical lands in bearing engagement with said partispherical seat.

* * * * *

PO-1050
(5/69)

UNITED STATES PATENT OFFICE
CERTIFICATE OF CORRECTION

Patent No. 3,785,172     Dated January 15, 1974

Inventor(s) Richard H. Parsons

It is certified that error appears in the above-identified patent and that said Letters Patent are hereby corrected as shown below:

Column 6, line 40, "136" shd be -- 128 --.

Column 7, line 15, "102" shd be -- 120 --.
        line 16, "136" shd be -- 132 --.

Signed and sealed this 2nd day of July 1974.

(SEAL)
Attest:

EDWARD M. FLETCHER,JR.        C.MARSHALL DANN
Attesting Offcier              Commissioner of Patents